United States Patent [19]
Schloss

[11] Patent Number: 6,063,293
[45] Date of Patent: May 16, 2000

[54] DEVICE TO FACILITATE REMOVAL OF SCREENINGS FROM A BAR SCREEN

[75] Inventor: Charles M. Schloss, Englewood, Colo.

[73] Assignee: Schloss Engineered Equipment, Inc., Aurora, Colo.

[21] Appl. No.: 09/201,320

[22] Filed: Nov. 25, 1998

[51] Int. Cl.[7] .................................................. B01D 29/64
[52] U.S. Cl. ........................ 210/739; 210/791; 210/159; 210/162
[58] Field of Search .................................... 210/158, 159, 210/162, 739, 767, 791

[56] References Cited

U.S. PATENT DOCUMENTS

| | | |
|---|---|---|
| 4,277,335 | 7/1981 | Hori .......................................... 210/159 |
| 5,074,996 | 12/1991 | Galanty et al. ........................... 210/159 |
| 5,571,406 | 11/1996 | Mensching ................................ 210/159 |

*Primary Examiner*—Robert J. Popovics
*Attorney, Agent, or Firm*—Gibson, Dunn & Crutcher LLP

[57] ABSTRACT

A device for cleaning a bar rack of the type used as a screen to remove solid objects from the inlet of a water or waste treatment plant. Such devices typically have rake and a motor to drive the rake up and down the screen; the motor being connected to the rake via a rake arm. The disclosed rake arm has a variable length in response to contact between the rake arm or the rake with an object fixed to the screen or resting on the channel floor. This variable length allows the motor to drive the rake without interruption to its normal operation. Such device has particular utility in a front cleaned rack.

16 Claims, 2 Drawing Sheets

6,063,293

DEVICE TO FACILITATE REMOVAL OF SCREENINGS FROM A BAR SCREEN

FIELD OF THE INVENTION

The present invention relates to screening equipment used in the field of water and waste water treatment plants. More particularly, the invention relates to a rake and related equipment for use in cleaning such screening equipment that is resistant to damage caused by jamming should the rake encounter a solid object.

BACKGROUND

In a typical water or waste water treatment plant, solid objets are removed from the liquid flowing through a fluid channel using one or more removal devices. Commonly, the first such device used to remove solids (also known as screenings) is a bar screen (also known as a bar rack) made up of a matrix of parallel bars placed vertically across the channel. The screen acts as a sieve to trap solids larger than the clear space between adjacent bars. Typical solids are pieces of paper, plastics and the like, and also somewhat larger objects.

The screen must be cleaned frequently of the accumulated solids. In small plants, a person using a rake or similar device scrapes the solids from the screen periodically. In larger plants, the raking operation is performed mechanically.

The screen may be may be cleaned by a rake moving in the upstream side of the screen (front cleaning) or by a rake moving in the downstream side of the screen (back cleaning). Because the solids are trapped from the upstream side of the screen, a front cleaning rake may have relatively short teeth which project into the spaces between the bars, while a back cleaning rake must have relatively longer teeth that extend through the bars into the upstream side.

An advantage of a back cleaned screen is that the rake is less likely to be jammed by a large object such as a rock, piece of pipe, or hose nozzle than a front or upstream cleaned rake would be. This is because a front cleaned rake may directly impact an object stuck in the channel, while only the teeth, at most, of a back cleaned rake will impact such an object. A disadvantage of the back cleaned rake is that for a given screen, the relatively long teeth of a back cleaned rake are less robust and more susceptible to bending that the shorter teeth of a comparable front cleaned rake.

Many different devices have been developed to mitigate the effects of jamming for a front cleaned screen. Examples of such devices are electric current sensing components which react to a sudden change in the motor current demand, direct shaft torque sensing, and more recently, sophisticated systems of flexible linkages, preferably equipped with bearings to prolong the components lifetime. Such devices may also be useful in a back cleaned screen. While these devices may be effective, they are in general complex, some are expensive, and some require a significant amount of space. Their utility in smaller bar screens has thus been very limited.

It can be appreciated in light of the foregoing discussion that there exists a need for a front cleaned rake that is protected from damage from impacting a stuck object that is simpler, more reliable, and more economical than known devices. Such a device is particularly useful in providing the advantages of a front cleaned rake than (e.g., shorter teeth) while eliminating the disadvantages. Without limiting the advantages of the present invention to the foregoing, it is a purpose of the present invention to provide such a device.

LEGEND OF REFERENCE CHARACTERS

| | |
|---|---|
| BR | bar rack |
| C1 | position of rake |
| C2 | position of rake |
| D | motor and drive means |
| F | arrow showing direction of flow |
| L | fluid channel |
| O | object |
| R | rake |
| S | screenings |
| 10 | rake arm |
| 11 | plate |
| 12 | outer tube |
| 12a | flange |
| 13 | inner tube |
| 14 | retainer |
| 15 | stop |
| 16 | bearing |
| 16a, 16b | upper and lower bearing portions |
| 17 | retainer |
| 18 | vertical plate |

DETAILED DESCRIPTION

Figure 1:
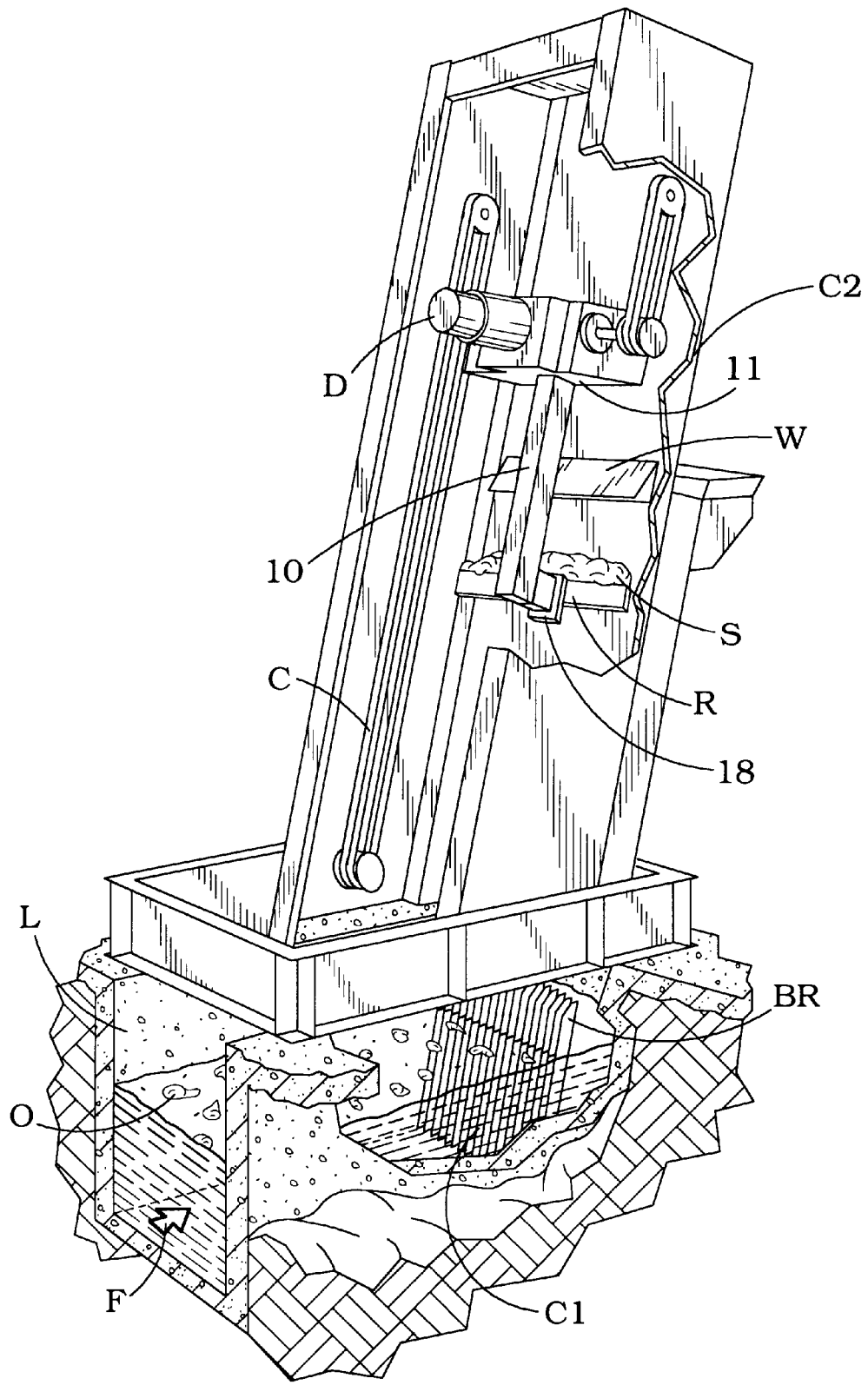
FIG. 1 is a pictorial representation of a rake arm together within a typical operating environment, according to an embodiment of the present invention.

A rake arm 10 according to an embodiment of the present invention is shown in a side elevation sectional view in FIG. 1. The operation of the rake arm 10 is explained in connection with FIG. 2.

Figure 2:
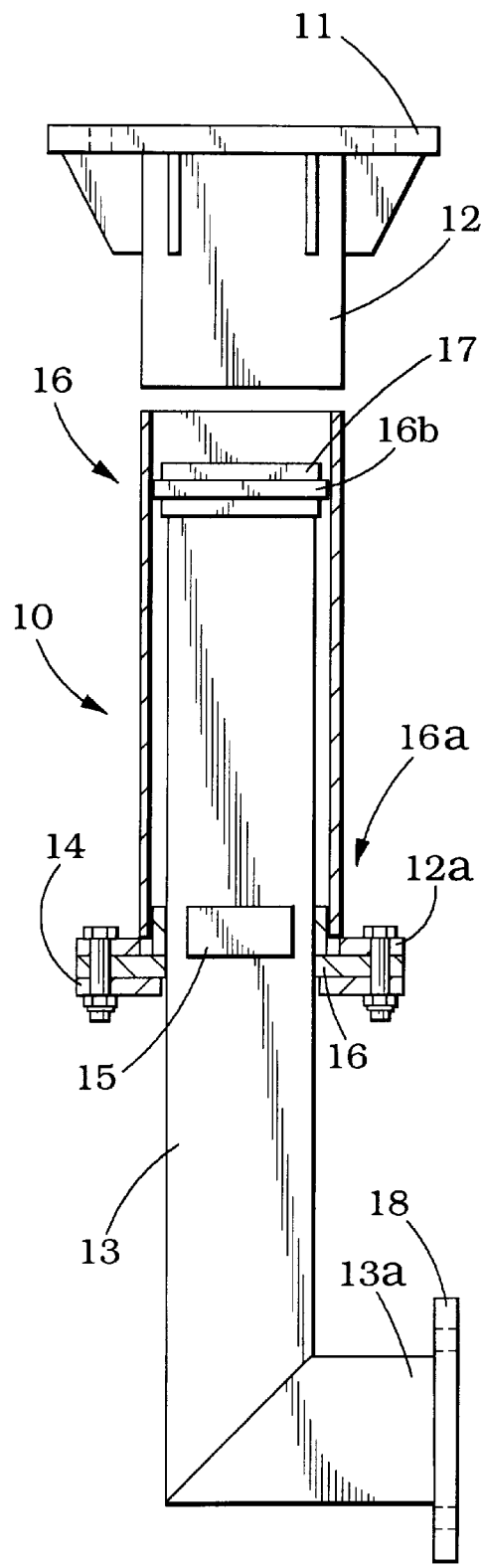
FIG. 2 is a side elevation view of the present invention, in partial section.

In FIG. 2, the rake arm 10 is positioned in relation to a bar rack BR having a matrix of bars so that the rake arm can clear screenings S from the bar screen. The bar rack BR is positioned in a fluid channel L having a direction of flow indicated by arrow F. In a typical application, the fluid channel L is an inlet to a waste water treatment plant.

The rake arm 10 engages a rake R that has teeth that protrude in an operating position through the bars of the bar screen BR. The rake arm 10 is driven by a motor D around an endless pin rack C in a substantially vertical reciprocating direction (i.e., up and down). As used herein, the motor D and pin rack C cooperate together to reciprocate the rake arm. As this is known in the art, the motor and pin rack need not be described in detail, and may be referred to as a drive means. Other structures may be used to reciprocate the rake, such as a drive belt, chain linkage system, or other systems. The rake arm 10 is driven substantially vertically upwards when the arm reaches position C1. In this position, the arm is positioned relatively close to the bars so that the rake R teeth protrude through the bars. The rake arm 10 is driven substantially downwards when the arm passes position C2. In this position, the rake arm 10 is positioned relatively further from the bars so that the rake R teeth are withdrawn from the bars. Summarizing, the rake arm 10 reciprocates up and down relative to the bars, and the rake R cleans the bars when the rake arm travels up.

The rake R serves to collect screenings S from the rack BR as the rake moves upwards. The rake R is wiped by a wiper W to clear the screenings S from the rake, and the cycle repeats.

A problem arises when a large object O comes to rest within the channel fluid F at the base of the bar rack BR. The rake arm 10 (or rake R) will collide with the object O as the rake arm travels downward. Such collision may damage the rake arm 10, and may also damage the rake R and the drive means.

The present invention overcomes the problem associated with a collision between the rake R or rake arm 10 and the object O (or any other obstruction) as explained in connection with FIGS. 1 and 2. The rake arm 10 includes a horizontal plate 11 that attaches, such as via bolts, to the motor D and associated drive means. The horizontal plate 11 is merely one means for attaching the rake arm 10 to the motor D and drive means, and it will be understood that many other methods of attachment can be substituted. The horizontal plate 11 attaches to an outer tube 12 which extends downward from the substantially horizontal plate.

The outer tube 12 houses an inner tube 13 that is slidably engaged with the outer tube 12 so that the inner tube can telescope into or out of the outer tube. The inner tube 13 preferably has an L bend portion 13a at a lower end of the inner tube. The L bend portion 13a engages a vertical plate 18 that in turn attaches to the rake R, such as via bolts. It should be appreciated that the L bend portion and the vertical plate are only one method for attaching the inner tube 13 to the rake R, and that many other mechanical configurations and attachment methods can be devised.

The rake arm includes several components that cooperate to maintain the telescoping relationship between the outer tube 12 and the inner tube 13. A bearing 16 is engaged with the outer tube 12 to guide the sliding of the inner tube 13 within the outer tube. Such bearings are conventionally used to connect metal components or the like that slide in relation to one another, and many bearing configurations may be used with good results. In the embodiment of FIG. 2, the bearing is separated into a lower portion 16a and an upper portion 16b. The lower portion 16a is attached approximately at the lowermost section of the outer tube 12 via a retainer 14 that bolts or is otherwise attached to a flange 12a of the lowermost section of the outer tube 12. The bearing 16a is bolted between the flange 12a and the retainer 14. It will be clear that the precise mechanical configuration between the bearing 16 and the tubes is not critical and could be arranged in many other ways.

The upper bearing portion 16b is attached to the outer tube 12 via a retainer 17, which may be a sleeve or other component that joins the upper bearing portion 16b to the outer tube 12. Again, the bearing 16 improves the slidable connection between the outer tube 12 and the inner tube 13 by reducing frictional wear.

A mechanical stop 15 is attached to the inner tube 13 to prevent the inner tube from extending more than a maximum fixed distance below the outer tube. In FIG. 1, the inner tube is shown extended at its maximum fixed distance. The stop 15 can be a protrusion that extends from the inner tube and abuts the lower bearing 16a, or it could be any other mechanical configuration which limits the travel of the inner tube with respect to the outer tube.

The force of gravity will normally cause the inner tube 13 to be maximally extended from the outer tube 12, as shown in FIG. 1, providing the rake arm 10 with a maximum length. However, a countervailing force will cause the inner tube 13 to telescope into the outer tube 12, thus shortening the total length of the rake arm 10 (it is apparent that the total length is determined by the length of the outer tube plus the length of the inner tube, minus the length of inner tube telescoped into the outer tube).

The function of the rake arm 10 is now described. First, it is noted that in the absence of an obstructive object O the operation of the rake arm 10 is as described in connection with FIG. 1 above. In all phases of operation, the rake arm 10 will be at its maximum length, since there is no force to overcome the force of gravity. However, if a fixed object O is positioned within the channel such that the rake arm 10 (or rake R) will contact the object, the inner tube 13 will telescope into the outer tube 12 as the motor D drives the rake arm downward. By "fixed", it is meant that the object O resists motion by contact with the inner tube 13 with a greater force than the force required to overcome the gravitational and frictional resistance of the inner tube 13 to telescope into the outer tube 12. Such an object O may also be referred to herein as a "large" object. The length that the inner tube 13 will telescope depends upon the size and position of the object 0 on the bar rack BR. Generally, but not always, the object O will be towards the bottom of the fluid F since such an object will often be significantly denser than water.

As the rake arm 10 begins its upwards reciprocation, the inner tube will telescope out of the outer tube until the rake arm's maximum length is achieved, whereafter the rake arm will continue its motion without telescoping until, in the next downward motion, the rake arm again contacts the object O.

A substantial benefit of the present invention is that the telescoping action when an object O is impacted prevents damage to the rake arm 10, motor D, or other components that may otherwise occur. This is because the motion of the outer tube 12, which is directly engaged with the motor D and drive means, is not appreciably affected by the object O. The outer tube 12 continues to reciprocate up and down in its normal range of motion. The inner tube 13 simply extends to the position of the object, and then telescopes into the outer tube 12. It is noted that the rake R does not clean the rack below the object O until the object is removed. This is more than an acceptable price to pay for the prevention of damage that would otherwise occur. In any event, a damaged rake R would not be effective in cleaning the rack either above or below the object.

As a further feature of my invention, suitable electronics (or other means) may be engaged with the rake arm so that the relative motion of the rake arm components may be detected, and used to generate a signal. Such signal may be used to generate an alarm to indicate a stuck object, and/or for control purposes.

It will be appreciated that the above described embodiment is illustrative of the present invention, but is certainly not the only conceivable embodiment that falls within its scope. For example, it is noted that an aspect of the invention is that the rake arm consists of two sections that slide in relation to one another. It is not necessary that the section be "tubes" as described, as they could be non-tubular members. Further, the lower tubes are described as "inner" and "outer" and have a concentric relation. However, the members need not be concentric, they could simply be laterally displaced form one another. As yet another example, it will be appreciated that components that are described as being separate from one another could be integrally formed, and that additional components could be added to control the sliding of the upper and lower members. For example, the inner tube and outer tube (or corresponding members) could be hydraulically or pneumatically engaged instead of the simple gravitational connection described. These examples are provided simply by way of illustration, and are not intended to define the scope of the invention, which is the purpose of the appended claims below and their legal equivalents.

What is claimed is:

1. A device for cleaning a bar screen for treatment plants, the device comprising:

means for cleaning screenings from the bar screen;

means for driving the cleaning means with respect to the bar screen;

means for engaging the driving means and cleaning means, said engaging means having a variable length that varies depending upon contact between (a) at least one of said engaging means and said cleaning means, and (b) a fixed or large object on said screen or channel bottom.

2. The device of claim 1, wherein the cleaning means is a rake engageable with said screen.

3. The device of claim 1, wherein the driving means reciprocates the cleaning means in an upward and downward motion with respect to the bar screen.

4. The device of claim 1, wherein fluid flows through the bar screen in a direction to define an upstream and downstream with respect to the bar screen, and the cleaning means is positioned upstream of the bar screen.

5. The device of claim 1, wherein the engaging means has a first member and second member slidable in relation to one another.

6. The device of claim 5, wherein the first member is an outer tube and the second member is an inner tube at least partially within the outer tube.

7. The device of claim 6, further comprising means for reducing friction between the tubes.

8. The device of claim 7, wherein the friction reducing means includes a bearing.

9. The device of claim 1, wherein the engaging means variable length is accomplished by telescopic action.

10. The device of claim 1, wherein the driving means driving one of the engaging means towards the fixed object causes a shortening of the engaging means, and the driving means driving the engaging means away from the fixed object allows a lengthening of the engaging means, at least over a range of operation.

11. The device of claim 1, wherein the engaging means has an L bend to connect to the cleaning means.

12. A device for cleaning a bar screen for treatment plants, the device comprising:

a rake engageable with the bar screen for cleaning screenings from the bar screen;

means for driving the rake, the driving means reciprocating the rake in an upward and downward direction with respect to the screen;

the driving means engaging the rake via a rake arm, the rake arm having a normal operating length and a less than normal operating length, the less than normal operating length being responsive to impact of at least one of the rake arm or the rake with a fixed object.

13. A method of protecting a rake arm for use in a bar screen from damage, the method comprising the steps of:

reciprocating a rake arm with respect to a bar screen, the rake arm being attached to a rake so that the rake clears screenings from the bar screen; and reducing the effective length of the rake arm when at least one of the rake and rake arm encounters a large object, so that the reciprocating step is not affected by the encounter.

14. The method of claim 13, wherein the step of reducing the length of the rake arm is accomplished by telescopic action of the rake arm.

15. The method of claim 13, wherein the step of reducing the length of the rake arm is used to generate a signal.

16. The method of claim 15, wherein the signal is for control or alarm purposes.

* * * * *